(12) United States Patent
Dach et al.

(10) Patent No.: US 11,336,063 B2
(45) Date of Patent: May 17, 2022

(54) INSERT FOR CONNECTING AN ELECTRIC CONNECTION TO A WALL, AND PROTECTIVE CAP FOR AN INSERT

(71) Applicant: FAIRCHILD FASTENERS EUROPE—CAMLOC GMBH, Kelkheim (DE)

(72) Inventors: Alexander Sebastian Dach, Hofheim (DE); Dieter Jüling, Kelkheim (DE)

(73) Assignee: FAIRCHILD FASTENERS EUROPE—CAMLOC GMBH, Kelkheim (DE)

( * ) Notice: Subject to any disclaimer, the term of this patent is extended or adjusted under 35 U.S.C. 154(b) by 0 days.

(21) Appl. No.: 17/261,788

(22) PCT Filed: Mar. 22, 2019

(86) PCT No.: PCT/EP2019/057293
§ 371 (c)(1),
(2) Date: Jan. 20, 2021

(87) PCT Pub. No.: WO2020/025177
PCT Pub. Date: Feb. 6, 2020

(65) Prior Publication Data
US 2021/0328392 A1    Oct. 21, 2021

(30) Foreign Application Priority Data
Aug. 3, 2018   (DE) .................... 20 2018 104 479.6

(51) Int. Cl.
*F16B 33/00*    (2006.01)
*H01R 13/73*    (2006.01)
(Continued)

(52) U.S. Cl.
CPC .......... *H01R 13/73* (2013.01); *H01R 13/5213* (2013.01); *H01R 13/622* (2013.01); *F16B 33/004* (2013.01)

(58) Field of Classification Search
CPC ...... F16B 33/004–37/14; F16B 37/145; H01R 13/72
See application file for complete search history.

(56) References Cited

U.S. PATENT DOCUMENTS 5,315,745 A     5/1994  Cantwell et al.
5,590,992 A *   1/1997  Russell .................... B60B 7/14
                                                  411/374
(Continued)

FOREIGN PATENT DOCUMENTS

DE      3033714 A1    3/1981
DE     19640891 A1    4/1998
(Continued)

OTHER PUBLICATIONS

International Search Report and Written Opinion of the International Search Authority for International Application No. PCT/EP2019/057293 dated Jun. 6, 2019.

*Primary Examiner* — Vanessa Girardi
(74) *Attorney, Agent, or Firm* — K&L Gates LLP

(57) ABSTRACT

The invention relates to an insert for connecting an electric connection to a wall (10), having a pin (1) with a shaft (4), which has a first connection means (5), and an electrically conductive ring (2) with a through-opening (6) for receiving the pin (1), wherein the shaft (4) of the received pin (1) protrudes out of a contact surface (11) of the ring (2). For protection purposes while working, for example while painting, the insert comprises a protective cap (20, 20') with a holding portion (21, 21') comprising a second connection means (26), which can be connected to the first connection means (5) of the pin (1), and a flange section (22, 22') which (Continued)

Figure 1:
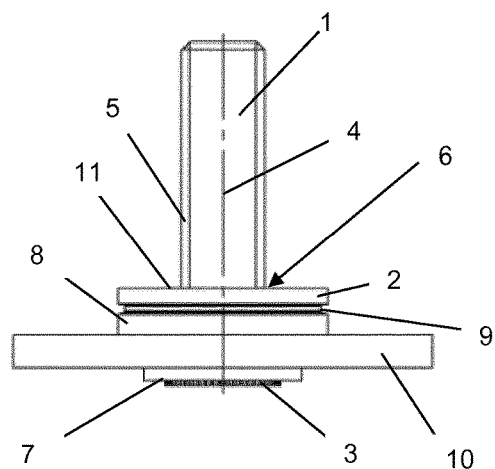

rests against the contact surface (11) of the ring (2) when the protective cap (20, 20') is connected.

19 Claims, 2 Drawing Sheets

(51) Int. Cl.
*H01R 13/52* (2006.01)
*H01R 13/622* (2006.01)

(56) References Cited

U.S. PATENT DOCUMENTS

| | | |
|---|---|---|
| 7,892,049 B1 | 2/2011 | Andler et al. |
| 10,920,818 B2 * | 2/2021 | Cowan .................. B64D 45/02 |

FOREIGN PATENT DOCUMENTS

| | | |
|---|---|---|
| DE | 202018101358 U1 | 4/2018 |
| EP | 1376766 A1 | 1/2004 |
| EP | 2263826 A1 | 12/2010 |
| EP | 2986509 A1 | 2/2016 |
| EP | 3293404 A1 | 3/2018 |

* cited by examiner

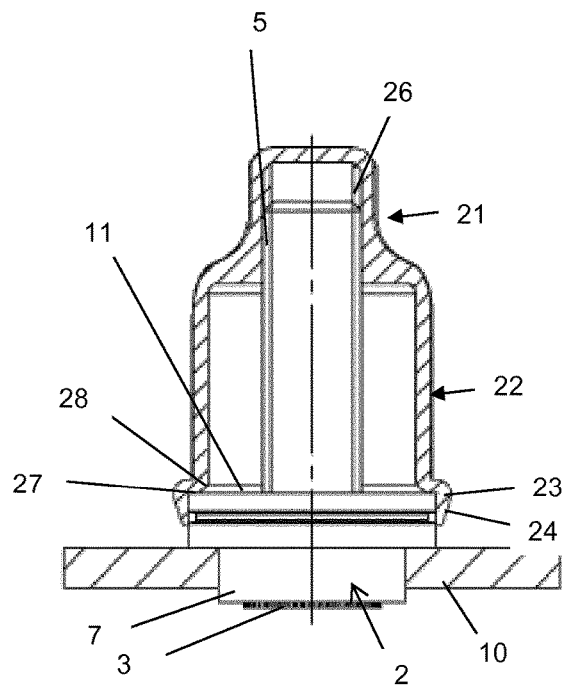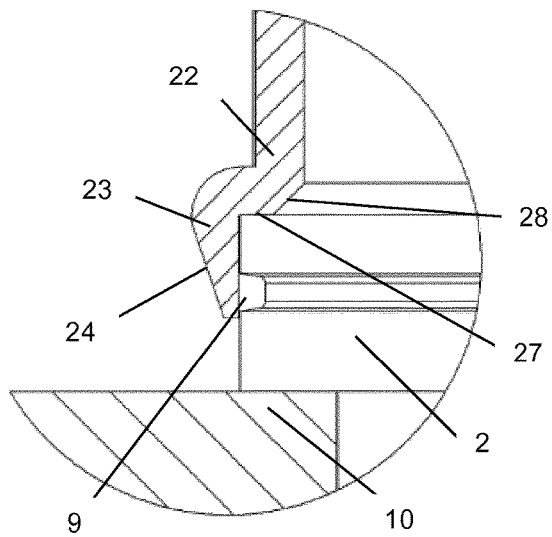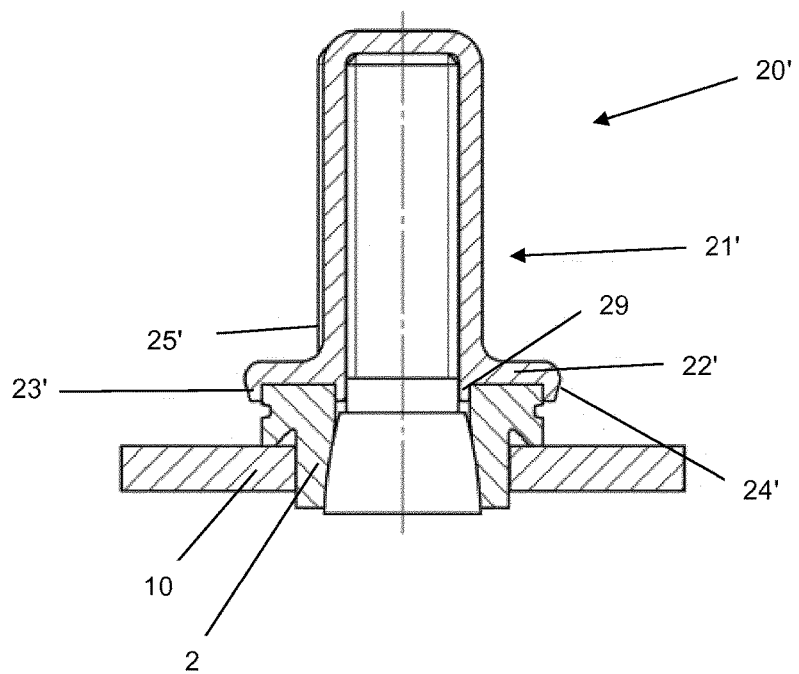

INSERT FOR CONNECTING AN ELECTRIC CONNECTION TO A WALL, AND PROTECTIVE CAP FOR AN INSERT

CROSS-REFERENCE TO RELATED APPLICATIONS

This application is a U.S. National Phase Entry under 35 U.S.C. § 371 International Patent Application No. PCT/EP2019/057293, filed on Mar. 22, 2019, which claims the benefit of German Patent Application Serial No. 202018104479.6, filed Aug. 3, 2018, the entire disclosures of which are hereby incorporated by reference herein.

The invention relates to an insert for connecting an electrical connection to a wall, for example a thin metal sheet, with a bolt having a shaft provided with a connecting means, and an electrically conductive ring with a passage for receiving the bolt, wherein the received bolt projects from a contact surface of the ring with its shaft. The invention also relates to a protective cap for such an insert.

Fastening a bolt (ground bolt or grounding bolt) to a metal sheet using a deformable sleeve or ring is a known method of establishing electrical conductivity between a cable and a metal sheet. To do this, the ring typically has a contact surface for the electrical connection of a cable, the bolt for fastening the cable possessing a connecting means, for example a thread, on its shaft. This shaft protrades from the contact surface of the ring such that when the cable is fastened with the connecting means, the latter is pressed onto the contact surface. The connection between the ring and the wall must be able to withstand tensile forces and a torque that can, for example, be produced by a nut when a cable lug is fastened onto the threaded bolt. This is accomplished with radial widening and increased surface pressure in the area of the metal sheet. The sleeve additionally widens beyond the metal sheet, so that increased tensile force can be achieved. The transmission of the current takes place on the walls of the bore in the metal sheet. The installation and deformation of the sleeve must ensure that the contact resistance is as low as possible in this area.

An insert of the above-mentioned type, which comprises a bolt and a ring, is known for this purpose from EP 0 880 199 B1. The bolt comprises a head, which extends along a first longitudinal axis, and a shaft, which is provided with at least one connecting means. For receiving the bolt, the ring is provided with a passage, which extends along a second longitudinal axis. The head of the bolt is configured roughly as a truncated cone, which widens the cylindrical passage of the ring when the head is pulled into the ring.

When such an insert is fastened to a wall, the bolt projects from the wall in an unprotected and exposed manner. In the course of subsequent work on this wall, there is a risk of damage being done to the bolt, for example to the thread thereof. In particular, walls such as sheet metal components must be painted after the insertion of a bolt. If when doing so paint is accidentally applied to the thread of the bolt, for example, then later the bolt can no longer be connected to a cable, at least not without considerable effort. Accidentally painting the contact surface of the ring leads to increased contact resistance between the cable and the wall because paints and varnishes generally have insulating properties. With high currents, excessive heating of the insert and the wall can occur, which can lead to damage to the wall. Depending on the use area, this can even lead to a considerable fire hazard, which is something that must be avoided.

A problem addressed by this invention is therefore that of providing an improved insert that provides protection during work, in particular during painting or varnishing.

This problem is solved by an insert with the features of claim 1. The insert according to the invention for connecting an electrical connection to a wall has a bolt with a shaft having a first connection means. A thread, a bayonet lock, a clevis pin or other fastening element, for example, can be provided as a connecting means. The insert according to the invention furthermore comprises an electrically conductive ring with a passage for receiving the bolt, wherein the received bolt projects from a surface of the ring with its shaft, which surface thus forms the contact surface of the ring. According to the invention, the insert furthermore comprises a protective cap having a retaining section with a second connecting means which is connectable to the first connecting means of the bolt, and a flange section adjoining the contact surface of the ring when the protective cap is connected.

In a preferred embodiment of the invention, the protective cap completely covers the shaft and the contact surface of the ring. The relevant areas of the insert are thus protected from damage and/or accidental application of paint.

In a preferred embodiment of the invention, the first connecting means and the second connecting means are arranged in such a way that the flange section of the protective cap is pressed against the contact surface of the ring by the convection of the first connecting means to the second connecting means. The contact pressure ensures a tightly sealed connection of the protective cap, thus preventing liquids such as paint or varnish from flowing in between the protective cap and the insert and thus from getting on the contact surface or the shaft in spite of the protective cap.

In a preferred embodiment of the invention, the flange section is essentially disc-shaped and has a top side facing the retaining section and a bottom side facing away from the retaining section, the bottom side adjoining the contact surface of the ring when the protective cap is connected to the bolt. Because the retaining section is directly connected to the shaft and the flange section flatly adjoins the contact surface, the insert protected by the protective cap takes up very lithe space. This embodiment is therefore especially suited for tight spaces. In particular, the second connecting means in the retaining section can be embodied as a clamping cylinder, the inner diameter of which corresponds to the outer diameter of the shaft. The retaining section and thus the protective cap are therefore connected to the bolt only by friction forces. Because the retaining section extends essentially over the entire length of the protective cap, the protective cap is securely retained on the shaft. In this embodiment, the protective cap can be especially quickly connected to the bolt because it is merely necessary to push it onto the latter.

In a particularly preferred embodiment of the invention, the disc-shaped flange section has an additional clamping ring projecting from its bottom side. The inner diameter of the clamping ring can be adjusted to the outer diameter of the shaft in order to be retained thereon by friction forces. As an alternative or in addition, the outer diameter of the clamping ring can be adjusted to the inner diameter of the passage of the ring in order to be retained thereon. The clamping ring thus constitutes an additional means of connecting the protective cap.

In a preferred embodiment of the invention, the flange section is essentially cylindrical and adjoins the ring with a front face, in particular an annular front face, which faces away from the retaining section. The cylindrical flange section can be particularly well engaged in order to connect the protective cap to the bolt. In addition, the protective cap is particularly well-sealed on the contact surface by the adjoining end face. The second connecting means in the retaining section can be configured in particular as a female thread in the retaining section. Because the retaining section and the thread arranged therein do not extend over the entire length of the protective cap, the latter can be produced particularly easily by injection molding. Furthermore, it is only necessary to screw the protective cap to the bolt over the length of the thread arranged in the retaining section rather than over the entire length.

In a particularly preferred embodiment of the invention, the protective cap has, on the flange section, a chamfer on the inner side of the protective cap, specifically on its front face facing away from the retaining section. Accordingly, the chamfer is arranged at the edge between the front face and the inner side of the cylindrical flange section. By virtue of the chamfer, the abutment surface of the flange section on the contact surface is further reduced, thereby giving rise to a higher contact pressure when the same force is exerted by the connecting means. This leads to a particularly tightly-sealed connection.

In a preferred embodiment of the invention, a cover ring, which encompasses a lateral surface of the ring, is arranged on the flange section. The cover ring ensures on one hand that the flange section is centered on the contact surface so that the flange section is not shifted under the action of an external lateral force, which could expose parts of the contact surface. Furthermore, the lateral surface of the ring is also protected from damage in this manner.

In a preferred embodiment of the invention, the ring has a groove on its lateral surface and the cover ring completely projects over the groove. The groove allows the ring to be grasped with a tool in order to perform repairs on the insert, for example. If the groove is damaged or accidentally filled with paint or varnish, a tool can no longer engage on the insert. By means of the cover ring, the groove is protected from damage as well as from accidental application of varnish and/or paint. It is thus ensured that the insert can be engaged with a tool.

In a preferred embodiment of the invention, the cover ring has a chamfer on its outer side, specifically on its front face facing away from the flange section. The edge between the front face and the outer side of the cover ring is thus chamfered. Because the wall is often painted or coated afterwards to prevent corrosion, it is necessary to ensure that this can be done completely. Access up to the edge between the wall and the lateral surface of the ring is made easier by the chamfer on the outer side of the cover ring.

In a preferred embodiment of the invention, the protective cap, on its outer side, has fluting on the retaining section and/or on the flange section. This serves to make the protective cap easier to manipulate so that the latter can be easily and securely connected, for example screwed, to the bolt.

In a preferred embodiment of the invention, the protective cap with the ring delimits a tightly sealed volume, wherein the shaft of the bolt and the contact surface of the ring are arranged within the volume. In the event of a blow, for example, the protective cap can thus deflect slightly inward into the volume in order to absorb the force of the blow without damage being done to the insert.

In a preferred embodiment of the invention, the protective cap comprises a plastic material. Because it is easily deformable, plastic is an excellent material for protecting the insert. Furthermore, it is light-weight and economically produced.

The material offers further advantages in terms of painting and coating by electro-chemical processes. If the protective cap were electrically conductive, it would also be uniformly coated during such processes. With plastic on the other hand, essentially only the part to be coated is painted because plastic is not electrically conductive.

The invention furthermore relates to a protective cap for an insert as described having a retaining section with a connecting means, which is connectable to a corresponding connecting means of a bolt of the insert, and a widened flange section for covering a contact surface of the insert. The protective cap according to the invention can in particular comprise the features described above.

Additional features, advantages and possible applications of this invention further result from the following description of exemplary embodiments and with reference to the drawings.

Figure 2:
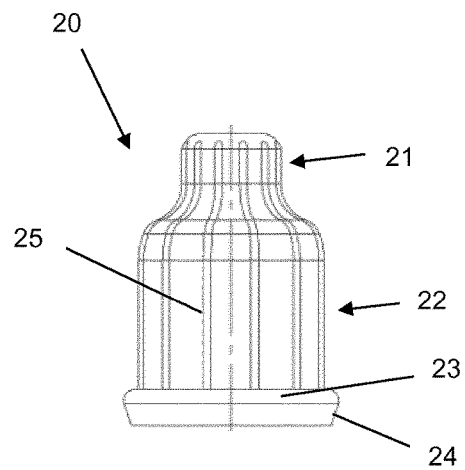
Figure 3:
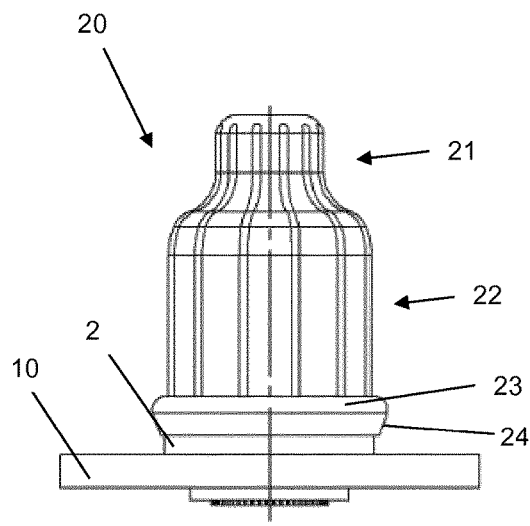
Figure 4:
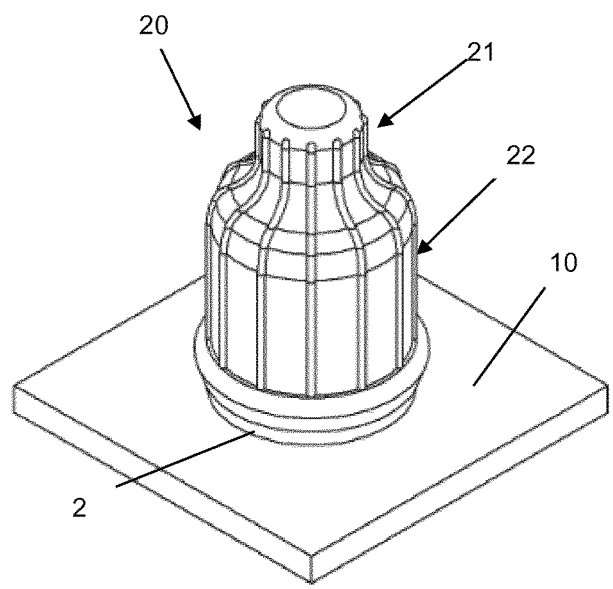

The drawings schematically show:

FIG. 1 A side view of a mounted insert without a protective cap,

FIG. 2 A side view of a protective cap according to the invention,

FIG. 3 A side view of an insert according to the invention with a protective cap, FIG. 4 A diagonal view from above of an insert according to the invention with a protective cap, FIG. 5 A cutaway view of an insert according to the invention with a protective cap, FIG. 6 A magnified section from the cutaway view of an insert according to the invention with a protective cap of FIG. 5, FIG. 7 A cutaway view of a second embodiment of an insert according to the invention with a protective cap.

FIG. 1 shows an insert with a bolt 1, which has a head 3 and a shaft 4 that extends along a center axis. On the outer surface of the shaft 4, provision is made of a male thread 5 as a connecting means for connecting the shaft 4 and thus the insert according to the invention to an electrical conductor by means of, for example, a cable lug. The cable lug is then pressed onto a contact surface 11 of the ring 2, the surface of which is electrically conductive and thus establishes an electrical connection to the wall 10 via the ring 2. The ring 2 is inserted in an opening of a wall 10 and has a passage 6, into which the bolt 1 with its head 3 is pressed. The passage 6 is thus slightly smaller than the outer diameter of the head 3 of the bolt 1. As a result, the ring is widened as the head 3 is pressed in and is thus firmly connected to the wall 10. The ring 2 has a sleeve section 7, which is essentially cylindrical and which is inserted in the opening of the wall 10. Another cylindrical area of the ring 2 has a larger outer diameter and is configured as a ledge 8, which adjoins an outer side of the wall 10. In addition, a groove 9 is arranged in the outer contour of the ledge 8, which groove runs completely around the ring 2 and is configured for the engagement of a tool. The shaft 4 of the insert projects from the wall 10 in an exposed manner and is thus susceptible to damage.

FIG. 2 shows a protective cap 20 of an insert according to the invention with a retaining section 21 and a flange section 22. Both the retaining section 21 and the flange section 22 are essentially cylindrical and connected to each other in a connecting region. The retaining section 21 has a smaller outer diameter than the flange section 22, wherein the connecting region is concave and narrows from the large diameter of the flange section 22 to the small diameter of the retaining section 21. A female thread 26 is arranged on the inside of the retaining section 21 as a second connecting means. On the bottom side of the flange section 22, which faces away from the retaining section 21, the flange section 22 has a cover ring 23. The cover ring 23 is arranged at the edge between its bottom side and the outer side of the lateral surface is provided with a chamfer 24. To connect the protective cap 20 to the bolt 1 inserted in the wall and the ring 2, the protective cap 20 is positioned over the bolt 1 and the female thread 26 of the protective cap is screwed to the male thread 5 of the bolt 1.

FIG. 3 shows the complete insert according to the invention, wherein the protective cap 20 is screwed onto the bolt 1 and the ring 2. The contact surface 11 of the ring 2 and the bolt 1 with its shaft 4 with the male thread 5 are completely covered by the protective cap 20. The cover ring 23 thus encompasses a lateral surface of the ring 2, the axial extension of the cover ring being selected in such a way that the groove 9 in the lateral surface of the ring 2 is also covered by the cover ring 23.

The illustration of the insert according to the invention in FIG. 4 shows that the protective cap 20 and in particular the retaining section 21 thereof is closed at the top and thus a sealed volume is formed by the protective cap 20 and the ring 2, in which volume the contact surface 11 of the ring 2 and the bolt 1 are arranged such that they are no longer accessible from outside.

FIG. 5 and the magnified illustration in FIG. 6 show a cutaway view of the insert according to the invention. The sleeve section 7 of the ring 2 is inserted in an opening of the wall 10 and, by pressing the head 3 into the sleeve section 7 of the ring 2, pressed together with the latter and the wall 10. The protective cap 20 is screwed with its retaining section 21 with the female thread 26 to the top end of the male thread 5 of the shaft 4. The retaining section 21 has an essentially cylindrical shape, which is closed at the top and connected to the flange section 22 at the bottom. The flange section 22 abuts with its front face 27 on the outer edge of the contact surface 11 of the ring 2. The length of the protective cap 20, the arrangement of the female thread 26 and the length of the shaft 4 with the male thread 5 are selected in such a way that the front face 27 is already in abutment on the contact surface 11 even when the protective cap 20 with its female thread 26 is still not screwed completely onto the male thread 5 of the bolt 1. Further screwing therefore results in the front face 27 exerting a force on the contact surface 11 and thus connecting the protective cap 20 to the ring 2 in a tightly sealed manner. Because the front face 27 has a chamfer 28 at its edge with the inside of the flange section 22, the mating surface between the end face 27 and the contact surface 11 is reduced, thus increasing the contact pressure. The annular mating surface between the end face 27 and the contact surface 11 has, in particular, a width that is less than the wall thickness of the flange section 22. This ensures that the protective cap is connected to the ring with a tight seal. The end face 27 of the flange section 22 transitions into the cover ring 23, which encompasses the lateral surface of the ring 2 and covers a groove 9 in the lateral surface. The cover ring has a chamfer 24 at the edge between the bottom side of the cover ring 23 and its outer side. This ensures that the corner between the wall 10 and the ring 2 also remains readily accessible during painting and can therefore be painted.

An alternative embodiment of the protective cap 20' is illustrated in FIG. 7. This embodiment likewise has a retaining section 21', but which instead extends essentially over the entire length of the bolt 1 up to the contact surface 11. As a flange section 22', provision is merely made of a disc-shaped element, which is pressed with its entire bottom side on the contact surface 11 of the ring 2. A cover ring 23' with a chamfer 24', which encompasses the lateral surface of the ring 2, is also arranged on the outer edge of the disc-shaped flange section. In addition, a clamping ring 29 is arranged on the bottom side of the flange section 22", the inner diameter of which ring is adjusted to the outer diameter of the bolt 1. In addition, the outer diameter of the damping ring 29 is adjusted to the inner diameter of the passage 6 of the ring 2. The protective cap is also retained on the ring 2 by this means. As a second connecting element, provision is merely made of a clamping cylinder in the retaining section 21' of the protective cap. This means that the inner diameter of the retaining section 21' is selected in such a way that it adjoins the outer side of the bolt 1. The protective cap is retained on the bolt by the friction between the thread of the bolt 1 and the retaining section. The protective cap can [therefore?] be pushed onto the bolt 1.

LIST OF REFERENCE SIGNS

1 Bolt
2 Ring
3 Head
4 Shaft
5 Male thread
6 Passage
7 Sleeve section
8 Ledge
9 Groove
10 Wall
11 Contact surface
20, 20' Protective cap
21, 21' Retaining section
22, 22' Range section
23, 23' Cover ring
24, 24' Chamfer, cover ring
25, 25' Fluting
26 Second connecting means
27 Front face
28 Chamfer, front face
29 Clamping ring

The invention claimed is:

1. An insert for connecting an electrical connection to a wall comprising
a bolt, with a shaft having a first connecting means,
an electrically conductive ring with a passage for receiving the bolt, wherein the received bolt projects from a contact surface of the ring with its shaft, wherein the ring comprises a groove on a lateral surface of the ring,
a protective cap having a retaining section with a second connecting means, which is connectable to the first connecting means of the bolt, and
a flange section adjoining the contact surface of the ring when the protective cap is connected,
wherein a cover ring encompasses the lateral surface of the ring, is arranged on the flange section, and completely projects over the groove.

2. The insert according to claim 1, wherein the protective cap completely covers the shaft and the contact surface of the ring.

3. The insert according to claim 1, wherein the first connecting means and the second connecting means are arranged in such a way that the flange section of the protective cap is pressed against the contact surface of the ring by the connection of the first connecting means and the second connecting means.

4. The insert according to claim 1, wherein the cover ring comprises a chamfer on its outer side on its end face facing away from the flange section.

5. The insert according to claim 1, wherein the protective cap has fluting on its outer side.

6. The insert according to claim 1, wherein the protective cap with the ring delimits a tightly sealed volume, wherein the shaft of the bolt and the contact surface of the ring are arranged within the volume.

7. The insert according to claim 1, wherein the protective cap comprises a plastic material.

8. The insert according to claim 1, wherein the flange section is essentially disc-shaped and adjoins the contact surface with a bottom side facing away from the retaining section.

9. The insert according to claim 8, wherein the essentially disc-shaped flange section comprises an additional clamping ring, which protrudes from the bottom side of the flange section, wherein the inner diameter of the clamping ring, in particular, is adjusted to an outer diameter of the shaft and/or the outer diameter of the clamping ring is adjusted to an inner diameter of the passage of the ring.

10. The insert according to claim 1, wherein the flange section is essentially cylindrical and adjoins the contact surface of the ring with a front face facing away from the retaining section.

11. The insert according to claim 10, wherein the protective cap, on the flange section, has a chamfer on the inner side of the protective cap on its front face facing away from the retaining section.

12. An insert for connecting an electrical connection to a wall comprising:
 a bolt comprising a shaft comprising a first connecting means;
 an electrically conductive ring comprising a passage for receiving the bolt, wherein the received bolt projects from a contact surface of the ring with its shaft;
 a protective cap having a retaining section with a second connecting means, which is connectable to the first connecting means of the bolt; and
 a flange section adjoining the contact surface of the ring when the protective cap is connected, wherein the flange section is essentially disc-shaped and adjoins the contact surface with a bottom side facing away from the retaining section, wherein the disc-shaped flange section comprises
 a clamping ring protruding from the bottom side of the flange section, wherein the inner diameter of the clamping ring is adjusted to an outer diameter of the shaft and/or the outer diameter of the clamping ring is adjusted to an inner diameter of the passage of the electrically conductive ring.

13. The insert according to claim 12, wherein the protective cap completely covers the shaft and the contact surface of the ring.

14. The insert according to claim 12, wherein the first connecting means and the second connecting means are arranged so that the flange section of the protective cap presses against the contact surface of the ring by the connection of the first connecting means and the second connecting means.

15. The insert according to claim 12, wherein the protective cap with the ring delimits a tightly sealed volume, and wherein the shaft of the bolt and the contact surface of the ring are arranged within the tightly sealed volume.

16. The insert according to claim 12, wherein the flange section is essentially cylindrical and adjoins the contact surface of the ring with a front face facing away from the retaining section.

17. The insert according to claim 16, wherein the protective cap, on the flange section, includes a chamfer on the inner side of the protective cap on its front face facing away from the retaining section.

18. The insert according to claim 12, wherein a cover ring encompasses a lateral surface of the ring and is arranged on the flange section.

19. The insert according to claim 18, wherein a lateral surface of the ring comprises a groove and the cover ring projects completely over the groove.

* * * * *